United States Patent [19]

Legg

[11] 4,273,264

[45] Jun. 16, 1981

[54] SPREADER MARKER HAVING A GROUND WHEEL ACTUATED AEROSOL SUPPLY

[76] Inventor: Howard W. Legg, 2229 N. Park, Grand Island, Nebr. 68801

[21] Appl. No.: 99,796

[22] Filed: Dec. 3, 1979

[51] Int. Cl.³ .............................................. B67D 5/64
[52] U.S. Cl. .................................. 222/162; 222/174; 222/611; 222/614; 239/156
[58] Field of Search .................. 222/162, 174, 402.15, 222/472, 473, 474, 610, 611, 613, 614, 623; 111/25-33; 239/150, 156, 172

[56] References Cited

U.S. PATENT DOCUMENTS

| 927,518 | 7/1909 | Fisher . | |
|---|---|---|---|
| 2,199,421 | 5/1940 | Stevens, Jr. . | |
| 2,703,256 | 3/1955 | Mascaro | 239/157 X |
| 3,019,470 | 2/1962 | Romeo . | |
| 3,114,481 | 12/1963 | West | 222/611 X |
| 3,443,727 | 5/1969 | Welford, Jr. | 222/162 |
| 3,481,545 | 12/1969 | Cook et al. | 239/172 |
| 3,807,605 | 4/1974 | Meharry et al. | 239/156 X |
| 3,871,557 | 3/1975 | Smrt | 239/150 X |

Primary Examiner—Robert J. Spar
Assistant Examiner—Fred A. Silverberg
Attorney, Agent, or Firm—Henderson & Sturm

[57] ABSTRACT

This invention relates to lawn spreader markers generally, and more specifically to an intermittent manually controlled marking apparatus which delineates the area covered by the spreader hopper opening and which utilizes foam as the marking material.

10 Claims, 4 Drawing Figures

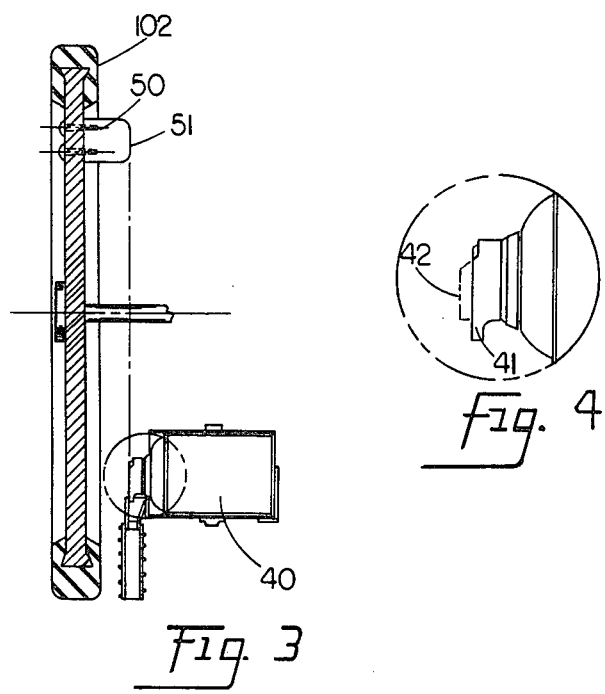
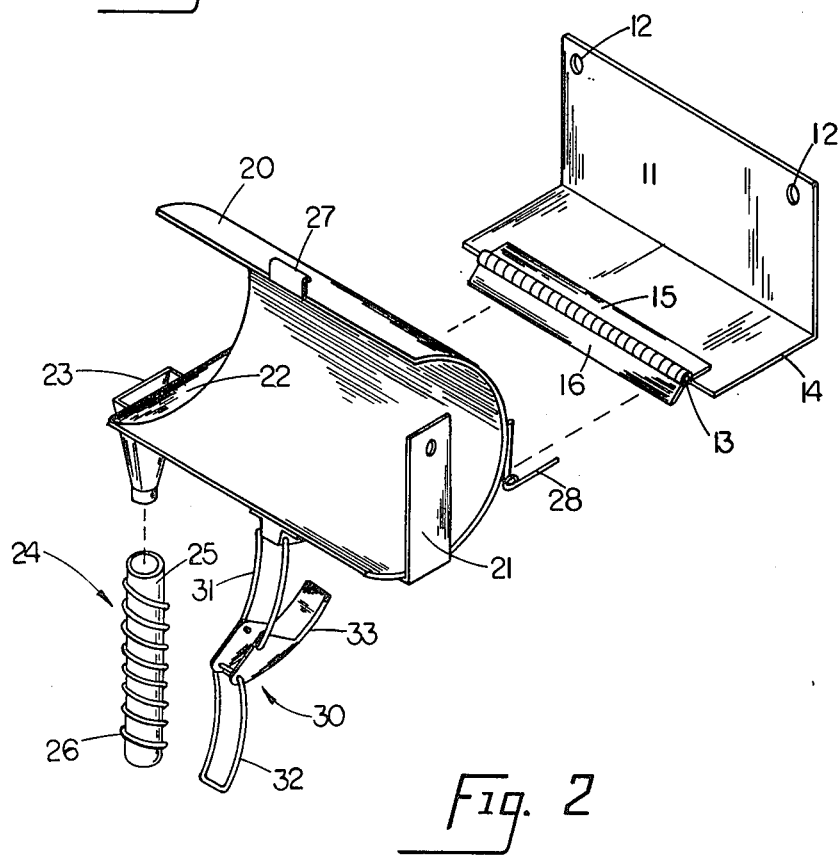

SPREADER MARKER HAVING A GROUND WHEEL ACTUATED AEROSOL SUPPLY

BACKGROUND OF THE INVENTION

This invention relates to granular material spreading devices which employ a marking means to delineate the path of travel of the spreader over a surface. Examples of such devices may be found in U.S. Pat. Nos. 927,518; 2,199,421; 3,019,470; 3,114,481; and 3,443,727.

Most of the prior art devices are characterized by the employment of powdered, granular or liquid marking material and the disposition of the marking apparatus relative to the wheels of the ground driven hopper, rather than the hopper opening, which is a more accurate indication of the area upon which the contents of the hopper have been spread.

Some of the deficiencies inherent in the prior art devices have been: the large amounts of marking material required by the continuous flow marking apparatus; a tendency of the granular and powdered marking material to become packed or caked together, thereby clogging the supply outlet and rendering the marker useless; the requirement for dual marking material dispensers with complicated or cumbersome mechanical controls to alternate the marking material supply when the spreader begins a return pass; and the failure of the designers to position the outlets of the material dispensers so that they coincide with the outermost ends of the spreader hopper outlet, to name but a few.

Some additional complaints concerning the prior art devices have been: the high visibility for extended periods of time of the marking material on the surface it contacted; the trouble, bother and mess associated with filling the marking material supply container, and the overall general complexity of the procedure which causes many owners to abandon their marking apparatus after a limited number of uses.

BRIEF SUMMARY OF THE INVENTION

An object of the present invention is the provision of a spreader marker which is simple to use, and which employs a self contained marking material supply.

Another object of the present invention is the provision of an intermittently actuated manually controlled spreader marker.

A further object of the instant invention is the provision of a spreader marker whose marking material is a highly visible aerated soapy foam when it is dispensed, which will evaporate in a relatively short period of time.

Still another object of the instant invention is the provision of a spreader marker which accurately delineates the path of the spreader hopper outlet.

Yet another object of the present invention is the provision of a spreader marker which employs a wheel mounted cam to intermittently actuate an aerosol can of foam material which comprises the marking material supply container.

A still further object of the instant invention is the provision of a spreader marker which is simple in construction and operation, uses a readily available dispensing container which can mark a large surface area without requiring replacement, and which will further accomplish all of the objects stated supra.

These and other objects, advantages and novel features of this invention will become apparent when considered in conjunction with the accompanying drawings and the detailed description which follows.

BRIEF DESCRIPTION OF THE DRAWINGS

FIG. 2 is a detailed view of the mounting bracket which secures the marking material dispenser;

FIG. 3 is a cross-sectional view taken through line 3—3 of FIG. 1, which illustrates the cooperation of the wheel mounted cam actuator with the marking material dispenser; and FIG. 4 is a partial enlarged view of the depressable actuator and the outlet of the aerosol can.

DETAILED DESCRIPTION OF THE PREFERRED EMBODIMENT

Figure 1:
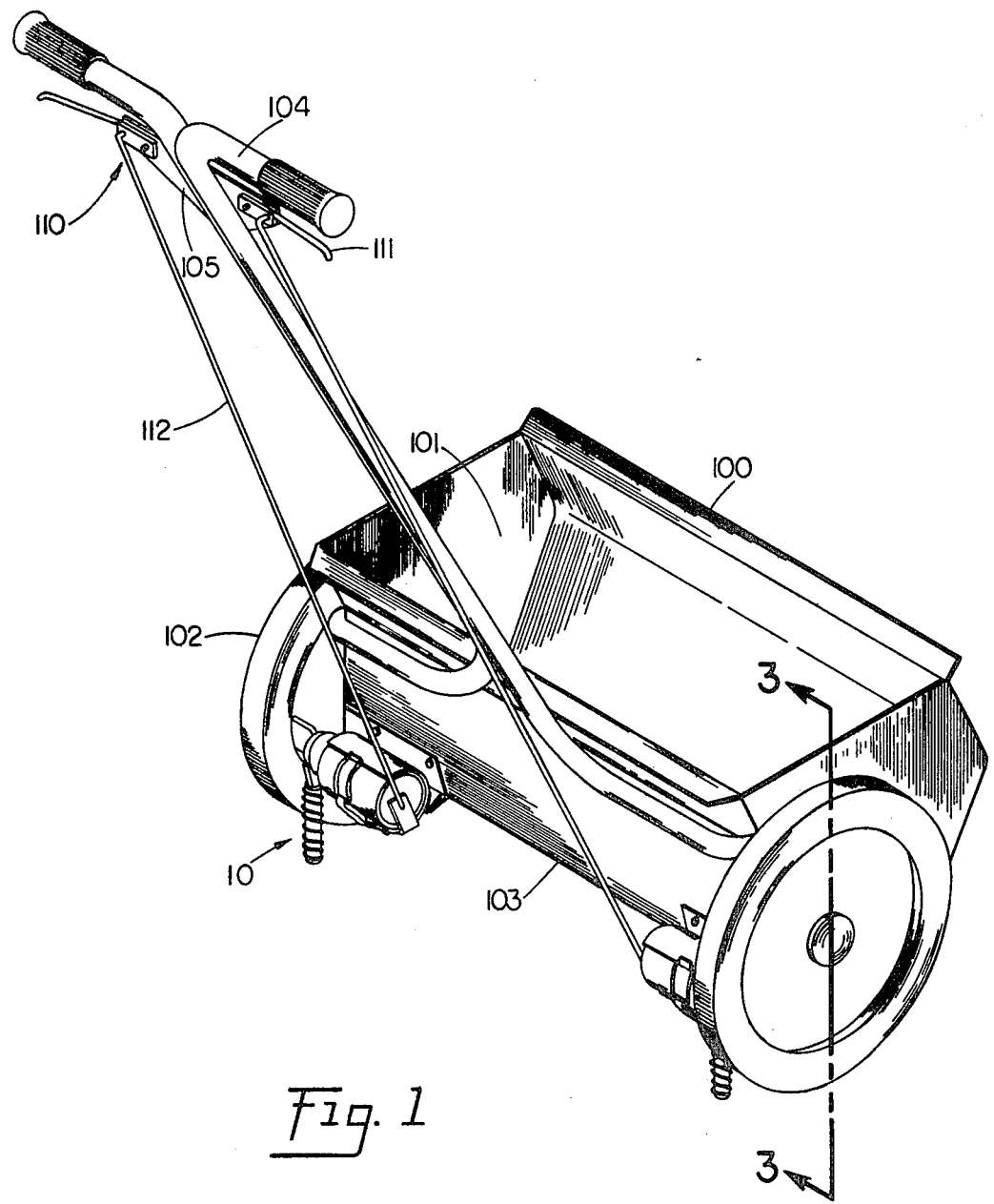
FIG. 1 is a perspective view of the spreader marker of the instant invention mounted on a typical lawn spreader.

As can be seen by reference to FIG. 1, the marking device is designated generally as 10 and is mounted on a standard lawn spreader device designated as 100. The lawn spreader 100 comprises a supply hopper 101 having an outlet opening (not shown) disposed at its tapered bottom 103 and the spreader is mounted on wheels 102 in a well known manner. Granular material in the form of grass seed, fertilizer etc., is introduced into the hopper and passes through the outlet opening in metered amounts via a ground driven metering element, to dispense the granular material over a surface as the wheeled spreader is pushed across the surface via a handle member 104.

Most lawn spreaders are designed to uniformly dispense the granular material over the traversed surface, and in order to insure that previously covered areas are not traversed or missed entirely, marking devices have been traditionally employed to indicate to the operator what portions of the surface have been covered by the spreader.

The marking device 10 of the instant invention is mounted on the rear face of the spreader hopper and comprises a mounting bracket 11 having a plurality of apertures 12 which receive securing means for fastening the bracket 11 to the hopper 101. The bracket 12 is L-shaped in configuration and has a hinged element 13 disposed on its free end 14. The inboard side 15 of said hinge element is secured to the bracket 11 and the outboard side 16 is secured to a cylindrical retaining member 20.

The retaining member 20 has a vertically disposed apertured abutment element 21 in the form of a leg spring positioned on one end, and a horizontally disposed abutment element 22 positioned at its other end. The horizontally disposed abutment element 22 has a tapered nozzle member 23, secured thereto and depending therefrom, which is provided with a nozzle extension 24, comprising an elongated tube 25 surrounded by a helical spring 26. The retaining member 20 is further provided with a clamping device 30 disposed at its mid-point and comprising two pivoted curved links 31, 32 connected by an intermediate latch element 33. One link 31 is pivotally secured to the retaining member, and the other link 32 is adapted to releasably engage a raised catch element 27 on the retaining member.

The retaining member 20 is configured to receive an aerosol can 40 of shaving cream of other foam material. The vertical abutment 21 spring biases the can 40 into engagement with the horizontal abutment 22. The outlet 41 of the can 40 is inserted into the tapered nozzle member 23 and then the clamping device 30 is pivoted upwardly so that the link 32 loosely engages the catch element 27. By pivoting the latch element 33, the aerosol can 40 is releasably secured in its operating position within the retaining member.

The aerosol can 40 has a depressable actuator 42 to release its contents, and the outlet 41 is normally disposed perpendicular to the ground via a spring 28, which is secured on one end to the mounting bracket and on the other end to the retaining member to maintain the aerosol can in the position shown in FIG. 1.

The wheels of the spreader are provided with one or more cam elements 50 which are disposed in such a manner as to intermittently engage the depressable actuator 42 of the aerosol can 40 as the wheel rotates. Contact of the actuator 42 by the cam 50 releases the contents of the pressurized dispenser 40 into the nozzle 23 and subsequently onto the ground to mark the path of travel of the spreader. The length of the contacting surface 51 and the number of cams 50 disposed on the wheels will determine the frequency and amount of the marking material (i.e., foam) dispensed.

As can be best seen in FIG. 1, the spreader 100 is provided with two marking devices 10 whose nozzles 23 and extensions 24 are disposed at the extreme ends of the hopper outlet. The handle 104 is provided with extension members 105 upon which are mounted a pivoted lever housing 110. The lever housing 110 supports an actuating handle 111 which is operatively connected to an elongated rod 112 which is connected at its lower end to the apertured abutment element 21. The manipulation of the actuating handle 111 will cause the rod 112 to reciprocate, thereby causing the apertured abutment elements 21 to pivot the retaining member 20 on the hinged element 13. The actuating handle 111 thereby pivots the retaining member 20 and associated depressable actuator 42 of the dispenser 40 into and out of the path of the cam 50.

The operation of the spreader marker is as follows; granular material is inserted in the hopper 101 and the dispenser 40 is clamped into the retaining member 20; on the first traverse of the surface, the actuator handles 111 are manipulated to position the depressable actuator 42 into the path of the cams 50; the cams 50 repeatedly and intermittently contact the actuators 42 to dispense the foam material into the nozzles 23 and subsequently onto the surface; at the end of the first pass, the operator selectively pivots one of the markers 10 out of the path of the cam 50 on its associated wheel to cease the dispensing of foam from that side of the hopper outlet. Both markers are engaged during the first pass of the spreader so that the operator can visually ascertain the path of the hopper outlet over the surface. When the spreader begins its second pass, the marker which would pass over the previously marked path is disengaged to conserve the marking material contained in its dispenser 40. The markers on each side of the hopper outlet are thereafter alternately engaged as the spreader passes back and forth across the surface.

It should be appreciated that the markers can be selectively engaged and disengaged at the whim of the operator. By using commercially available shaving cream dispensers as the marking material supply, the operator will normally have a readily available source of supply, and can then utilize the shaving cream for the normal purpose when the operator is not using the spreader marker.

Having thereby disclosed the subject matter of this invention, it should be obvious that many modifications, substitutions, and variations of the invention are possible in light of the above teachings. It is therefore to be understood that the invention may be practised other than as specifically described, and should be limited only by the breadth and scope of the appended claims.

I claim:

1. A marking device for a lawn spreader comprising:
    a bracket secured to the spreader body;
    an aerosol can filled with marking material pivotably supported on said bracket via a retaining member; and
    at least one cam means mounted on one wheel of said spreader, and adapted to engage the aerosol can to dispense its contents beneath the lawn spreader.

2. A marking device as in claim 1 wherein the retaining member comprises:
    a cylindrical member configured to receive and support the aerosol can; and
    a hinge element securing said cylindrical member to said bracket.

3. A marking device as in claim 2 wherein the retaining member further comprises:
    a horizontally disposed abutment member bearing a nozzle on one end of said cylindrical member;
    a flexible abutment member on the other end of said cylindrical member; and
    clamping means disposed on said cylindrical member for releasably securing said aerosol can in said retaining member.

4. A marking device as in claim 3 wherein:
    the flexible abutment member resiliently biases the aerosol can against the horizontally disposed abutment member.

5. A marking device as in claim 3 wherein:
    said nozzle is configured to receive the outlet of the aerosol can and position the depressable actuator of the can in the path of travel of the cam.

6. A marking device as in claim 5 wherein:
    a spring element normally biases the retaining member to a position wherein the nozzle is disposed perpendicular to the surface over which the lawn spreader travels, and the depressable actuator is positioned in the path of travel of the cam.

7. A marking device as in claim 6, further comprising:
    manually actuated means to pivot the retaining member to a position wherein the depressable actuator of the can is rotated out of the path of travel of the wheel mounted cam.

8. A marking device as in claim 3 wherein:
    the nozzle is positioned in the same vertical plane as one end of the lawn spreader outlet opening.

9. A marking device as in claim 1 wherein:
    the marking material is shaving cream.

10. A marking device for a lawn spreader comprising:
    an aerosol can of foam material pivotally disposed on the body of the lawn spreader; and
    one or more cam elements mounted on a wheel of the lawn spreader and positioned to intermittently engage the aerosol can actuator as the wheel rotates to dispense the contents of the can as the wheel traverses a surface over which the lawn spreader moves.

* * * * *